United States Patent [19]

Wiley

[11] 3,709,125

[45] Jan. 9, 1973

[54] PHOTOGRAPHIC LINE TRACING APPARATUS

[75] Inventor: John P. Wiley, Vestal, N.Y.

[73] Assignee: International Business Machines Corporation, Armonk, N.Y.

[22] Filed: June 1, 1971

[21] Appl. No.: 148,430

[52] U.S. Cl. ....................95/12

[51] Int. Cl. ....................G03b

[58] Field of Search ....................95/12

[56] References Cited

UNITED STATES PATENTS

| | | | |
|---|---|---|---|
| 3,330,182 | 7/1967 | Gerber et al. | 95/1 R |
| 3,232,690 | 2/1966 | McKee et al. | 352/216 X |

*Primary Examiner*—Samuel S. Matthews
*Assistant Examiner*—Kenneth C. Hutchison
*Attorney*—Hanifin & Jancin

[57] ABSTRACT

An optical system having a light source, condensing lens and projection lens for tracing lines on a moving photosensitive plate which is provided with a rectangular apertured reticle positioned between the condensing lens and projection lens for defining the line to be traced and a pair of field shutters independently movable adjacent said reticle. One shutter normally completely covers the aperture and the other shutter normally completely uncovers the aperture. Said one shutter is moved in synchronism with the moving plate to uncover the aperture and start tracing a line and said other shutter is moved in synchronism with the moving plate to cover the aperture to terminate a line being traced whereby uniform exposure is provided throughout the entire length of the line being traced.

12 Claims, 11 Drawing Figures

INVENTOR

JOHN P. WILEY

BY G. R. Gugger

AGENT

PHOTOGRAPHIC LINE TRACING APPARATUS

BACKGROUND OF THE INVENTION

The trend of printed circuits of today is miniaturization and tighter tolerances. The smaller sizes and closer dimension of these printed circuits require similar and more stringent requirements of the glass masters from which they are produced. The result is an ever increasing need for better control of the light beam which exposes the glass masters and precision reticle positioning along with other process requirements.

The main control required of the light beam is constant intensity along with constant exposure time or the proper combination of each. Variation in either causes circuit patterns to vary in width and also results in poor edge definition. Even using multiple reticles, the positioning of these becomes a problem, particularly maintaining accuracy from reticle to reticle and being able to repeatably locate any one reticle.

Probably the main technique for tracing circuit patterns in the past has been the use of portional lamp control for controlling the light beam. With this method, lamp intensity is varied to compensate for changing exposure time. Exposure time is determined by the combination of tracing speed and the length of the reticle in the direction of trace. The operation as briefly described is that the light beam with the shutter closed is placed over the photosensitized glass plate at the point where the line is to begin. The shutter then opens, allowing the beam to expose a portion of the line to be generated, and the light beam moves relative to the glass plate starting the trace. During the acceleration period, the light intensity is varied appropriately to achieve best line quality. When the speed is low, the intensity is low and as the velocity increases to some constant value, the intensity increases proportionally. As the line approaches its termination, the velocity goes through a deceleration mode where intensity adjustment is again required.

The shortcomings of this method are that the reticle must have some physical length which results in some exposure gradient when the shutter first opens and there is also some difficulty in matching intensity to tracing speed. This difficulty of matching intensity is amplified by the fact that the lamp intensity degrades with age even at constant power level. Each of these problems contributes to line width variations and poor edge definition. Existing artwork generator shutters are able to provide uniform exposure at line terminations if the lines are generated by a series of small segments. However, this method is not satisfactory because there is the problem of abutting segments and also of stopping or slowing down the moving table which carries the photosensitized glass master.

SUMMARY OF THE INVENTION

Since the best control can be achieved by tracing at a constant velocity and the poorest control occurs during acceleration and deceleration of the trace, the present invention overcomes the aforementioned problems by making use of a completely constant velocity trace. This is accomplished by placing the photosensitive glass plate in motion beneath a fixed light projection system. A rectangular reticle is provided which will define the line to be traced. Adjacent the reticle there is provided a pair of synchronized field shutters for beginning and terminating the trace. They are essentially a start shutter blade and a stop shutter blade which are independently moved at a constant velocity such that the image of the shutter is moving at the same velocity as the photosensitive glass plate.

Prior to starting a tracing operation, the start shutter is put in a closed position where it completely covers the reticle to block the light beam from passing through it and the stop shutter is put in an open position where it does not block the light from passing through the reticle. With the sensitized glass master in motion, a line trace is started by moving the start shutter at a constant velocity to uncover the reticle and start exposure. The reticle is completely uncovered and as the glass plate continues to pass under it a continuous line is exposed. When it is desired to terminate the line, the stop shutter is moved at a constant velocity to cover the reticle. When the reticle becomes completely covered, the termination end of the line being traced is defined.

The important feature of this shuttering action is that every portion of the line along its length, including points at the very front and very end, have seen an equal time of exposure as well as the same intensity. Hence, no exposure gradient exists because of reticle length. Also, the table carrying the glass plate need not stop for terminations thus greatly increasing over-all machine speed. In addition, much greater exposure levels or lower intensities are possible since effective exposure can be increased by increasing the image length. This will permit either greater machine speeds or use of lower sensitivity, higher resolution materials.

It is, then, a primary object of this invention to provide a novel and improved shutter arrangement for use in a photo tracing system.

A further object of the present invention is to provide a novel and improved shutter and reticle arrangement for exposing lines on a photosensitized glass plate.

Another object of the present invention is to provide a reticle and a pair of synchronized field shutters for tracing a line on a photosensitized glass plate with uniform exposure throughout the entire length of the line.

A still further object of the present invention is to provide a reticle and a pair of synchronized field shutters independently movable at a constant velocity for uncovering and covering the reticle to provide uniform exposure at the ends of a line being traced on a photosensitized plate.

Another object of the present invention is to provide a reticle and a pair of synchronized field shutters for tracing a line on a moving photosensitized plate with uniform exposure throughout the entire length of the line without stopping or slowing down the moving plate.

A still further object of the present invention is to provide a reticle and a pair of synchronized field shutters independently movable at a constant velocity for tracing a line on a moving photosensitive plate with the shutter image moving at the same velocity as the photosensitive plate.

The foregoing and other objects, features and advantages of the invention will be apparent from the following more particular description of preferred embodiments of the invention as illustrated in the accompanying drawings.

DESCRIPTION OF PREFERRED EMBODIMENTS

Figure 2:
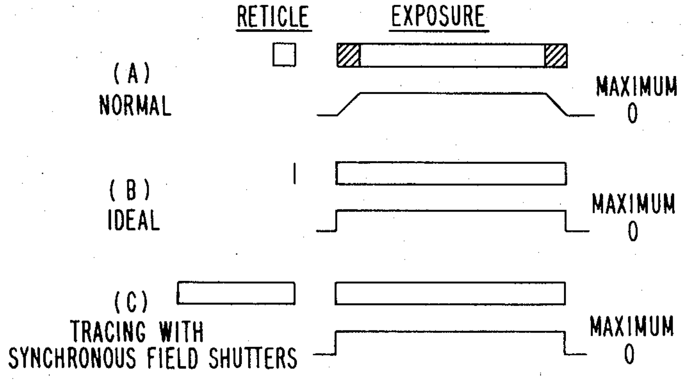
FIG. 2 is a chart illustrating line tracing exposure processes.

Referring first to the chart shown in FIG. 2, previous large-area artwork generators have used start-at-end-of-line and stop-at-other-end-of-line with proportional intensity control or step and repeat with flashing techniques, either stationary or on the fly. Each of these processes have both advantages and definite limitations such as output tolerances of the product and speed. Most of these systems made use of normal reticles that had approximately square aspect ratios. If this type of reticle were used with a fast shutter in a slow mode, then the output exposure might look like that shown at (*a*) on the chart. The grey areas at the beginning and end cannot be tolerated and this output is totally unacceptable for precise end-of-line termination requirements. Shown at (*b*) is the near perfect condition in which the reticle is as long as the output line is wide, and is extremely narrow in width. This is not very practical as the exposure time along the line has to be very slow or the unit area energy must be very high for proper exposure. To produce denser artwork patterns over large areas with tighter tolerances, the method found best for line tracing in a photo tracing machine is shown at (*c*). This method utilizes relatively low energy and makes use of synchronized field shutters to control the starting and ending of line segments while the line is being traced at a constant velocity.

Figure 1A:
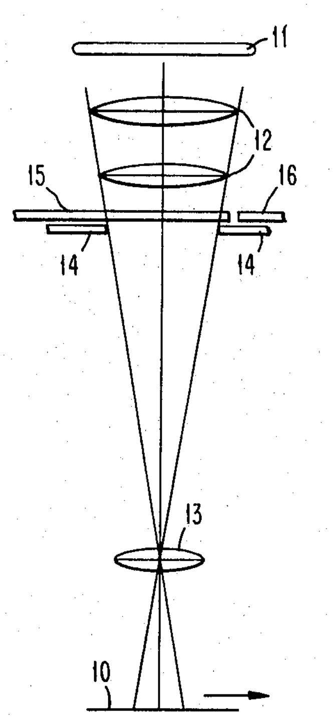
FIGS. 1*a*, 1*b*, 1*c* and 1*d* are schematic diagrams illustrating the principle of operation of the present invention.

The principle of operation of the synchronized field shutters is illustrated in FIGS. 1*a* – 1*d*. As shown in FIG. 1*a*, a photosensitive plate 10 is put into constant velocity motion beneath a fixed projection system which comprises a light source or lamp 11, condensing lens 12 and projection lens 13. A rectangular reticle 14 is provided which will define the line to be traced. Adjacent to the reticle is a start shutter blade 15 and a stop shutter blade 16 which are suitably mounted for movement back and forth over the reticle. As shown in FIG. 1*a*, the start shutter 15 is in a closed position covering the reticle and no line is being traced.

Figure 1B:
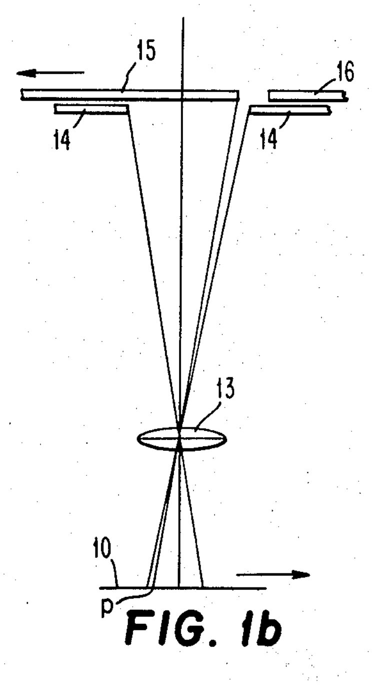
Figure 1C:
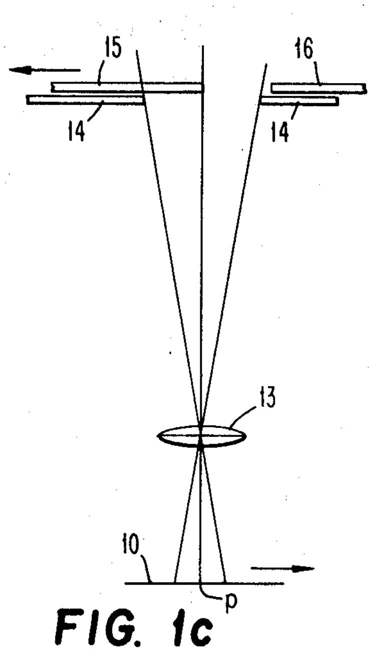
Figure 1D:
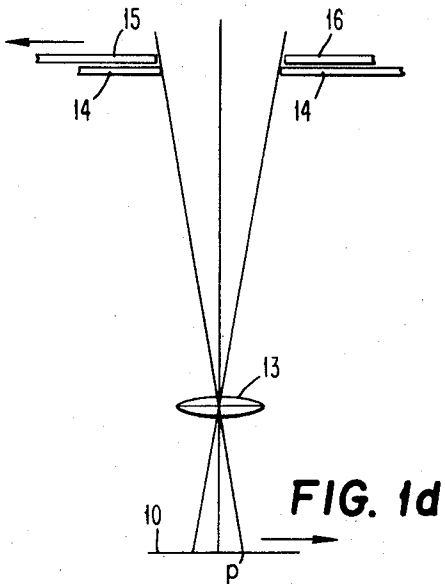

To start tracing a line, the start shutter is moved in the direction shown in FIG. 1*b* to start uncovering the reticle and exposing the front edge of the line. Suitable drive means would be provided to drive the shutter at a constant velocity which is $1/m$ times the velocity of the photosensitive plate 10 with $m$ being equal to the magnification of the projection lens 13. In FIG. 1*c*, the shutter is shown at an intermediate point. The image of the shutter is moving at the same velocity as the photosensitive plate. This provides an exposure of the shutter edge at a fixed point $p$ on the plate. In FIG. 1*d*, the shutter is shown completely open and a continuous line is being traced. When it is desired to terminate the line being traced, the stop shutter, which is normally in the open position as shown, is put into motion at a constant velocity toward a closed position over the reticle. The velocity of the stop shutter is also $1/m$ times the velocity of the plate and when it completely covers the reticle, the traced line is terminated. Suitable reset mechanism would be provided to restore the shutters to the position shown in FIG. 1*a*.

It can be seen that the resulting exposure will be uniform throughout the entire length of the line including the termination. The exposure is given by E being equal to $IL/v$, where I is the image intensity, L is the image length, and $v$ is the plate velocity.

Figure 3:
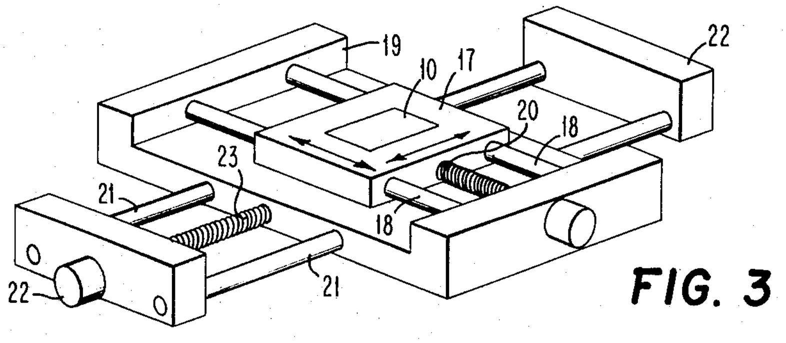
FIG. 3 is a diagrammatic view showing an x-y table arrangement.

The present synchronized shutter arrangement is particularly adapted for use in large scale artwork generators. One form of this type of machine currently on the market is the Gerber Printed Circuit Generator. An integral part of such machines is the x-y table drive for supporting and transporting the photosensitive plate. One well-known type which has been used is shown in FIG. 3. The photosensitive plate 10 is positioned on an upper base plate 17 which is slideably mounted on guide rods 18 fixed in a U-shaped bottom plate 19. Conventional lead screw drive means 20 are provided to drive the plate 17 in either direction along the rods 18. The bottom plate 19 is slideably supported on rods 21 disposed at right angles to the rods 18 and fixed between bracket members 22. Lead screw drive means 23 are provided to drive plate 19 in either direction along the rods 21, plate 19 also carrying plate 17 with it.

FIGS. 4 – 8 show several embodiments of synchronized field shutters which could be built into an artwork generator having an optical system as shown in FIG. 1a to carry out the principle of the present invention. A still further embodiment is shown in common assignee's copending U. S. application, Ser. No. 148,353 filed on June 1, 1971.

Figure 4:
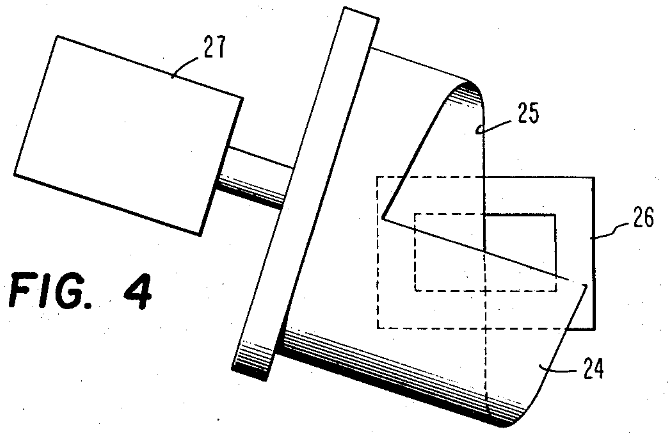
FIG. 4 is a diagrammatic view of a field shutter employing a helix design.

Referring first to FIG. 4, a field shutter is shown which takes the form of a thin cylinder 24. The shutter edge in this case is provided by a helical edge 25 cut from the cylinder and synchronized rotation of the cylinder causes the shutter edge to traverse across the reticle 26. Synchronization is obtained by use of a stepping motor 27. The axis of rotation must be made equal to the helix angle used in forming the shutter to obtain the advantage of having a straight termination perpendicular to the edge of the traced line.

Figure 5:
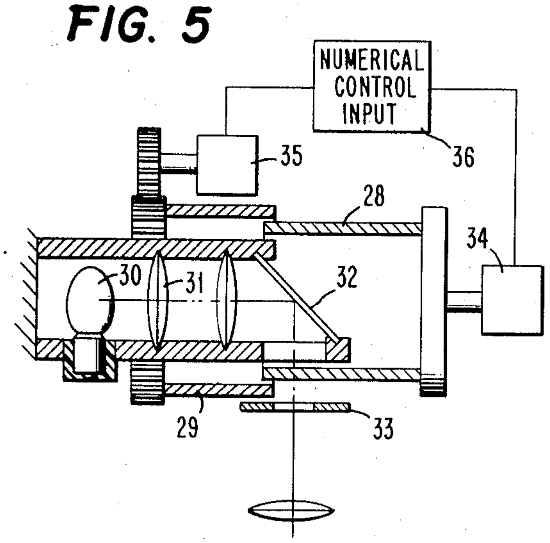
FIG. 5 is a diagrammatic view illustrating the arrangement of a pair of field shutters of the type shown in FIG. 4.

In FIG. 4 only one helical shutter is shown to avoid confusion. However, it will be understood that both a helical start shutter and a helical stop shutter would be used with the start shutter initially in a closed position to completely cover the aperture in the reticle and the stop shutter in an open position completely uncovering the aperture. As illustrated in FIG. 5, a helical start shutter 28 and stop shutter 29 would be arranged in telescoping fashion with one rotating inside the other. Mounted inside of the assembly is the light source 30, condensing lens 31 and a mirror 32 which directs the light beam through the aperture in the reticle 33 and suitable projection lens. Synchronized rotation of the shutters is obtained through suitable gearing and the stepping motors 34 and 35. A numerical control input 36 similar to that employed in the Gerber Printed Circuit Generator would be used to program the stepping motors.

Figure 6:
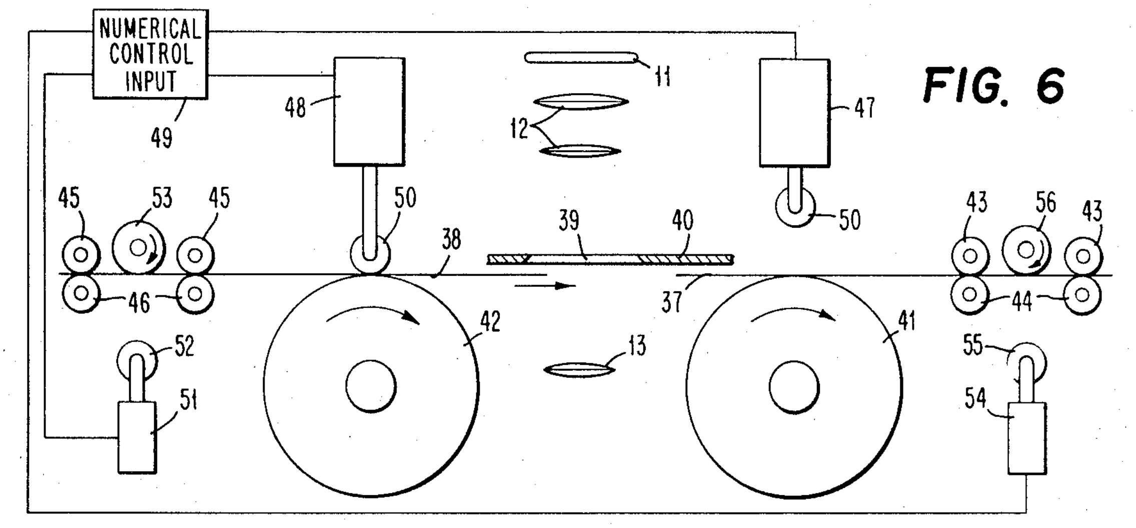
FIG. 6 is a diagrammatic view showing the arrangement of a pair of capstan operated field shutters.

In another embodiment shown in FIG. 6, the start shutter 37 and stop shutter 38 take the form of thin blades which are driven across the aperture 39 in reticle 40 by a pair of rotating capstans 41 and 42. The start shutter is supported between two sets of opposing guide rolls 43 and 44 and similarly the stop shutter is supported between two sets of opposing guide rolls 45 and 46. Suitable drive means would be provided to make the capstans run continuously with a peripheral velocity of $1/m$ times the velocity of the photosensitive plate on which the line is to be traced. Actuators 47 and 48 under control of a numerical control input 49 are provided to force the shutters 37 and 38 selectively against the capstans. These actuators may be air or hydraulic cylinders, solenoids, or other convenient means. The actuators are provided with rollers 50 so that the shutters will move at the peripheral velocity of the capstans and this velocity is adjusted so that proper synchronization is obtained. As shown in FIG. 6, the start shutter has been driven to the right to an open position and the actuator 47 reset indicating that a continuous line is being traced and capstan 42 and actuator 48 are causing the stop shutter 38 to be driven toward the right to a closed position to terminate the line. Upon termination of the line, actuator 48 is reset and a similar actuator 51 is activated to force roller 52 and the stop shutter against a continuously running reset capstan 53 causing the stop shutter to be reset to the left to its normal open position. Also, another actuator 54 would be activated to force roller 55 and the start shutter against a continuously running reset capstan 56 causing the start shutter to be reset to the left to its normal closed position preparatory to beginning the trace of another line. Suitable stop means would be provided at the left end of the stop blade and pull stop means at the right end of the start blade to stop the blades at the proper reset position.

Figure 7:
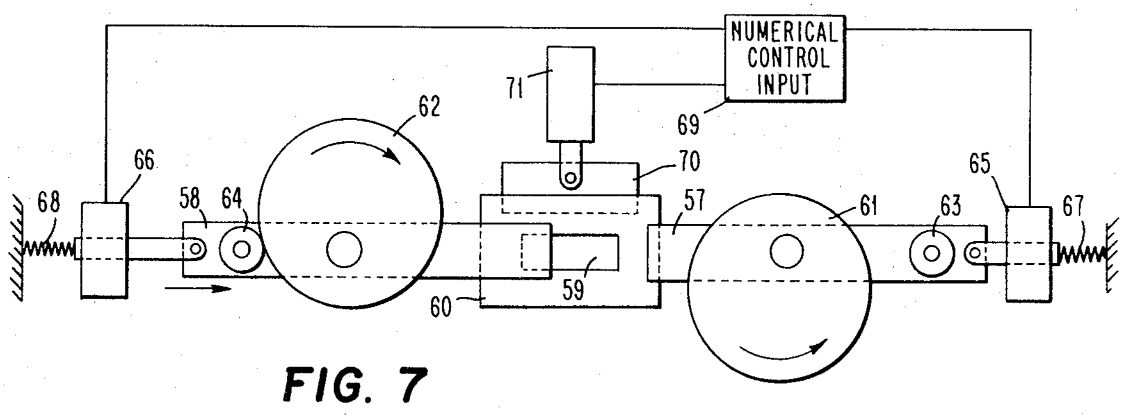
FIG. 7 is a diagrammatic view showing the arrangement of a pair of cam operated field shutters.

Referring now to FIG. 7, in this design the start shutter 57 and stop shutter 58 take the form of thin blades which traverse back and forth across the aperture 59 in reticle 60 under control of a pair of cams 61 and 62 which operate against the roller followers 63 and 64 on the blades. Suitable constant velocity motors would be provided to drive the cams and the rate of rise of the cams would be $1/m$ times the velocity of the table carrying the photosensitive plate. These cams are caused to rotate constantly when the table is running so that a given point on the cam surface always corresponds to a known point of the table travel.

The shutter blades are held away from the cams, except during line terminations, by a start blade actuator 65 and a stop blade actuator 66. These actuators may be any convenient device giving a straight line motion and if they are solenoids, as is shown, solenoid tension springs 67 and 68 are used. Synchronized shuttering is obtained by energizing one of the actuators under control of a numerical control input unit 69 so that the associated cam follower 63 or 64 is held in contact with the cam surface. An auxiliary shutter 70 and associated actuator 71 are provided to cover the aperture 59 and prevent exposure when no line is desired.

In the position shown in FIG. 7, the auxiliary shutter 70 has been picked and is in its retracted position and the start shutter 57 is in a deactivated or open position indicating that a line has been started and is being continuously traced. Actuator solenoid 66 has been activated to force the stop shutter 58 to follow the surface of cam 62 and the shutter is moving toward the right to cover the aperture 59 and terminate the line. When the line is terminated, actuator 71 is deactivated to extend the auxiliary shutter and cover the aperture preventing any further exposure. Then, actuator solenoid 66 is deactivated and the stop shutter 58 is retraced to the left to its open position. To start a line trace, actuator solenoid 65 is actuated to force the start shutter 57 to the left to follow the surface of cam 61. It is not critical at this point that the shutter hit the low point on the cam and completely cover the aperture since the auxiliary shutter has not been picked yet. When the low point is reached and the aperture is covered, the auxiliary shutter 70 will be picked and retracted and the start shutter 57 will reverse and start moving to the right under the influence of cam 61 to uncover the aperture and start tracing a line.

The advantage of the cam design is that synchronization is obtained by mechanical adjustment of the cam positions. Actuator operation need only be in very approximate synchronization with table travel. This results in a further advantage in that speed is limited only by the ability of the actuators to keep the followers in contact with the cams.

Figure 8:
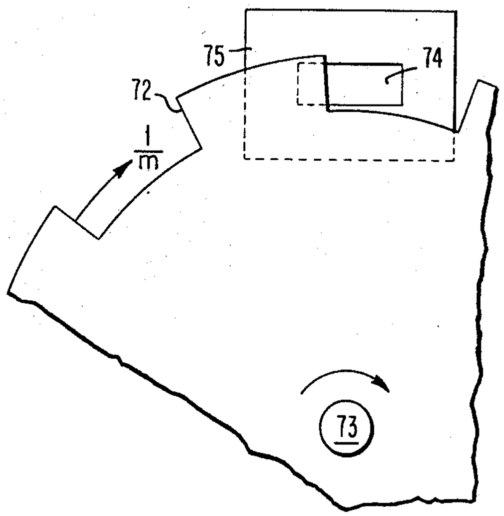
FIG. 8 is a partial diagrammatic view of a crenelated disc type field shutter arrangement.

In FIG. 8 there is shown a fairly simple design wherein the lines are terminated by means of a crenelated disc 72. A termination is performed by synchronously rotating the disc by shaft 73 which is driven by a suitable motor so that the peripheral disc speed is $1/m$ times the velocity of the table travel. The edge of the crenelation then traverses across the aperture 74 in reticle 75 in synchronization with a desired point on the x-y table. When any start or stop termination is complete, the crenelated disc is automatically in position for the next termination and no resetting mechanism is required. The operation of this design is entirely dependent on suitable numerical control of the motor driving shaft 73.

It can be seen that any of the above described embodiments provide a method of insuring uniform exposures during line starts and line terminations on an automatic artwork generator and especially in the case where high intensity illumination which cannot be contracted by other means is necessary. In the case of constant table velocity, the use of synchronized field shutters is essential.

While the invention has been particularly shown and described with reference to preferred embodiments thereof, it will be understood by those skilled in the art that various changes in form and details may be made therein without departing from the spirit and scope of the invention.

What is claimed is:

1. In an optical system having a light source, condensing lens and projection lens for tracing lines on a moving photosensitized plate, the combination of:

a rectangular apertured reticle positioned between said condensing lens and projection lens for defining the line to be traced;

a pair of field shutters independently movable adjacent said reticle, one of said shutters normally completely covering said aperture and the other shutter normally completely uncovering said aperture; and means for moving said shutters at a constant velocity and in synchronism with said moving plate for uncovering and covering said aperture to provide uniform exposure at the ends of a line being traced on said photosensitized plate.

2. In an optical system having a light source, condensing lens and projection lens for tracing lines on a moving photosensitized plate, the combination of:

a rectangular apertured reticle positioned between said condensing lens and projection lens for defining the line to be traced;

a pair of field shutters independently movable adjacent said reticle for uncovering and covering said aperture to start and terminate the tracing of a line on said photosensitized plate; and means for moving said shutters at a constant velocity which is $1/m$ times the velocity of the photosensitized plate with $m$ being equal to the magnification of said projection lens whereby the image of each shutter moves at the same velocity as the photosensitized plate and uniform exposure is produced throughout the entire length of the line being traced.

3. In an optical system having a light source, condensing lens and projection lens for tracing lines on a moving photosensitized plate, the combination of:

a rectangular apertured reticle positioned between said condensing lens and projection lens for defining the line to be traced;

a start shutter blade and a stop shutter blade mounted adjacent said reticle for movement back and forth across said aperture, said start shutter being normally in position to completely cover said aperture and the stop shutter normally in position to completely uncover said aperture;

means for moving said start shutter in synchronism with said moving plate to uncover said aperture and start tracing a line; and means for moving said stop shutter in synchronism with said moving plate to cover said aperture and terminate a line being traced.

4. An optical system as defined in claim 3 wherein said start and stop shutter blades are moved at a constant velocity which is $1/m$ times the velocity of the photosensitive plate with $m$ being equal to the magnification of said projection lens whereby the start shutter image and stop shutter image move at the same velocity as the photosensitive plate.

5. In an optical system for tracing lines on a moving photosensitized plate, the combination of:

a rectangular apertured reticle for defining the line to be traced;

a pair of independently rotatable shutter cylinders arranged in telescoping fashion adjacent said reticle, each cylinder having a helical edge which will traverse across the aperture in the reticle when the cylinder is rotated;

a light source, condensing lens and mirror mounted inside said cylinder arrangement for directing a light beam through the aperture in said reticle, the helical edge of one cylinder being normally in position to completely cover said aperture and the helical edge of the other cylinder being normally in position to completely uncover said aperture;

means for rotating said one cylinder in synchronism with said moving plate to cause the helical edge to uncover said aperture and start tracing a line; and means for rotating said other cylinder in synchronism with said moving plate to cause the helical edge to cover said aperture and terminate a line being traced.

6. An optical system as defined in claim 5 wherein the axis of rotation of said cylinders is equal to the helix angle of the helical edges to provide straight termination perpendicular to the edge of a traced line.

7. In an optical system having a light source, condensing lens and projection lens for tracing lines on a moving photosensitized plate, the combination of:

a rectangular apertured reticle positioned between said condensing lens and projection lens for defining the line to be traced;

a start shutter blade and a stop shutter blade mounted adjacent said reticle for movement back and forth across said aperture, said start shutter being normally in position to completely cover said aperture and the stop shutter normally in position to completely uncover said aperture;

a first continuously rotating capstan adjacent one side of said start shutter;

first actuator roller means adjacent the opposite side of said start shutter and selectively operable to force the start shutter against said rotating capstan whereby said shutter will move at the peripheral velocity of the capstan to uncover said aperture and begin the tracing of a line;

a second continuously rotating capstan adjacent one side of said stop shutter;

second actuator roller means adjacent the opposite side of said stop shutter and selectively operable to force the stop shutter against said second rotating capstan whereby said stop shutter will move at the peripheral velocity of the capstan to cover said aperture and terminate a line being traced; and selectively operable means for resetting said start and stop shutters preparatory to tracing another line.

8. An optical system as defined in claim 7 wherein said capstans are driven at a constant velocity which is $1/m$ times the velocity of the photosensitive plate with $m$ being equal to the magnification of said projection lens.

9. In an optical system having a light source, condensing lens and projection lens for tracing lines on a moving photosensitized plate, the combination of:

a rectangular apertured reticle positioned between said condensing lens and projection lens for defining the line to be traced;

a start shutter blade and a stop shutter blade mounted adjacent said reticle for movement back and forth across said aperture;

a first continuously rotating cam adjacent said start shutter;

a first roller cam follower mounted on said start shutter;

first actuator means connected to said start shutter and normally holding said shutter and roller follower out of contact with said cam, said actuator means being selectively operable to force said roller follower against the surface of said cam whereby the start shutter will move across said aperture to begin tracing a line;

a second continuously rotating cam adjacent said stop shutter;

a second roller cam follower mounted on said stop shutter;

second actuator means connected to said stop shutter and normally holding said shutter and second roller follower out of contact with said second cam, said second actuator means being selectively operable to force said second roller follower against the surface of said cam whereby the stop shutter will move across said aperture to terminate a line being traced;

an auxiliary shutter mounted adjacent said reticle for movement back and forth across said aperture; and third actuator means connected to said auxiliary shutter and normally holding said shutter in position to cover the aperture and prevent exposure when no line tracing is desired, said third actuator means being selectively operable to retract said shutter and uncover the aperture when line tracing is desired.

10. An optical system as defined in claim 9 wherein said cams are constant velocity cams and have a rate of rise which is $1/m$ times the velocity of the photosensitive plate with $m$ being equal to the magnification of said projection lens.

11. In an optical system having a light source, condensing lens and projection lens for tracing lines on a moving photosensitized plate, the combination of:

a rectangular apertured reticle positioned between said condensing lens and projection lens for defining the line to be traced; and a rotatable disc mounted adjacent said reticle and having a crenelated periphery overlapping said aperture such that upon rotation of said disc at a constant velocity and in synchronism with said moving plate the edges of the crenelations will move across the aperture to start and terminate line tracing.

12. An optical system as defined in claim 11 wherein said disc rotates with a peripheral speed which is $1/m$ times the velocity of the photosensitive plate with m being equal to the magnification of said projection lens.

* * * * *